United States Patent [19]

Pike et al.

[11] 4,205,095

[45] May 27, 1980

[54] GLYCERIDES

[76] Inventors: Marshall Pike, Stanhope Rd., Camberley, Surrey; Iain G. Barr, 35, Regent Rd., Liverpool L5 9TB, both of England; Florent Tirtiaux, 601, Chaussee de Charleroi, B6220 Fleurus, Belgium

[21] Appl. No.: 957,686

[22] Filed: Nov. 6, 1978

Related U.S. Application Data

[63] Continuation of Ser. No. 847,557, Nov. 1, 1977, abandoned.

[30] Foreign Application Priority Data

Nov. 4, 1976 [GB] United Kingdom ............... 45986/76

[51] Int. Cl.$^2$ .......................... A23D 5/00; A23D 5/02
[52] U.S. Cl. ................................. 426/607; 426/478
[58] Field of Search ............... 426/601, 606, 607, 478; 260/428.5

[56] References Cited

U.S. PATENT DOCUMENTS

| | | | |
|---|---|---|---|
| 2,975,060 | 3/1961 | Best et al. | 426/607 |
| 3,093,480 | 6/1963 | Arnold | 426/607 X |
| 3,686,240 | 8/1972 | Kawada et al. | 426/607 X |
| 4,061,798 | 12/1977 | Kanegae et al. | 426/607 |

*Primary Examiner*—Robert A. Yoncoskie
*Attorney, Agent, or Firm*—Murray and Whisenhunt

[57] ABSTRACT

Palm oil is subjected to a two-stage fractionation in a solvent free system using controlled heating and cooling to give a mid-fraction of iodine value 48–53 and melting point 32°–38° C. The isolated mid-fraction is then either subjected to partial hydrogenation to reduce its linoleic acid content to not more than 2% or preferably has 0.01–1.5% of a dry edible gum e.g. a mixture of guaranate and carraghenate gums, incorporated therein. This gum treatment converts this particular mid-fraction into a dimensionally stable solid which can be cast or moulded and can be used to extend cocoa butter in amounts up to 30% or more without adversely affecting the Jenson cooling curve.

13 Claims, No Drawings

GLYCERIDES

This is a continuation application of Ser. No. 847,557, filed Nov. 1, 1977, now abandoned.

This invention relates to glycerides and is particularly concerned with a method of producing a cocoa butter substitute or extender from palm oil.

Cocoa butter is a naturally occurring triglyceride which has acquired considerable importance in the confectionary industry. World requirements for cocoa butter now far exceed the supply of the natural product and considerable effort has been devoted over recent years to producing synthetic or semi-synthetic substitutes which can be used to replace, or more usually, to extend, naturally occurring cocoa butter.

For many years, palm oil has been recognized as a potential starting material for the manufacture of cocoa butter substitutes and various processes have been proposed involving, as the major step, a fractionation of palm oil to give a so-called mid-fraction. The exact nature of the mid-fraction is controlled by the exact fractionation method used and, prior to the present invention, as a practical matter, the only fractionation methods which have been available for producing a mid-fraction from palm oil suitable for use as a cocoa butter substitute have been fractionation methods involving the use of an additive such as water or a solvent. Various solvents have been proposed for use in this process, notably acetone, and by controlling the nature and proportion of solvent and by controlling temperatures, it has been possible to separate palm oil into various components.

In order to produce palm oil mid-fraction suitable for use as a cocoa butter substitute, it is necessary to remove from the palm oil most of the tri-saturated glycerides and most of the di- and tri-unsaturated glycerides to leave a product which is essentially a 1,3-di-saturated-2-mono-unsaturated glyceride where the number of carbon atoms in the saturated and unsaturated chains and the nature of the unsaturation chain is such that at room temperature, the mid-fraction is solid but that the mid-fraction has a relatively narrow melting range in the region of human body temperature, about 37° C.

It is not only necessary to control the exact triglyceride composition of the mid-fraction to give the correct melting range, but also to give the correct mechanical properties and the correct taste to a chocolate or other product in which the cocoa butter substitute is incorporated. In order to control the physical properties of the mid-fraction, it is necessary to ensure that the unsaturated portion of the glyceride is primarily the 2-mono-unsaturate.

Fractionation methods involving the use of solvent are not altogether attractive on a commercial scale because they involve the additional cost of providing the solvent, handling the larger volumes of liquid that the use of solvent produces and, eventually, removing the solvent. We have now found that it is possible to isolate from palm oil a mid-fraction suitable for use as a cocoa butter substitute or extender by a fractionation method which does not require the use of a solvent or any other added chemical and which the fractionation is brought about simply by careful control of temperatures.

The present invention provides a method for producing a cocoa butter substitute or extender comprising the steps of:

1. maintaining a phospholipid-free neutralised pre-bleached palm oil having an iodine value (IV) of 50–55 at a temperature of 42°–52° C. for a period of at least 6 hours, 2. increasing the temperature of the palm oil to 70°–75° C. over a period not exceeding 2 hours and then immediately cooling the palm oil to a temperature of 28°–33° C. over a period of not less than 5 hours to produce a first liquid fraction of IV 55–60 and a first solid fraction of IV 38–44 and melting point 50°–55° C., 3. separating the first liquid fraction from the first solid fraction within 5 hours of completion of formation of the first solid fraction, 4. maintaining the first liquid fraction at a temperature of at least 65° C. for a period of time sufficient to form a fluid homogeneous crystal free oil and then maintaining the first liquid fraction at a temperature of 38°–48° C. for a period of at least 4 hours.

5. increasing the temperature of the first liquid fraction to 60°–65° C. over a period of 1.5–2 hours and then immediately cooling the first liquid fraction to a temperature of 14°–17° C. over a period of not less than 10 hours to produce a second liquid fraction of IV 59–64 and cloud point 3°–7° C. and a palm oil mid-fraction of IV 48–53 and melting point 32°–36° C.

6. separating the second liquid fraction from the mid-fraction at a temperature of 14°–17° C. within 3 hours of completion of formation of the mid-fraction, and then either 7A. subjecting the separated mid-fraction to catalytic hydrogenation under conditions such that the IV is reduced to 38–45, the linoleic acid content is reduced to not more than 2% and the melting point of the hydrogenated mid-fraction is 33°–36° C. or 7B. incorporating into the separated mid-fraction a total of 0.01–1.5% by weight of at least one edible structural modifier based on the weight of mid-fraction.

By operating in this way, it is found that it is possible, without adding any further chemicals to the palm oil during the fractionation, to produce a palm oil mid fraction of excellent properties for use as a cocoa butter substitute either directly or after a selective partial hydrogenation.

In carrying out the fractionation, we have found it convenient to monitor the process by determining the iodine value of the various fractions. In the specification, iodine value means the iodine value calculated in accordance with British Standard 684. Melting points are measured in accordance with British Standard 684.

We find it important to use a neutralised pre-bleached palm oil as starting material in our process. The prior removal of phospholipids, acidic materials and dark colouring materials is well known in the processing of palm oil and facilitates the subsequent fractionation.

In the first step of the fractionation, the oil is first maintained at a temperature of 42°–52° C. for at least 6 hours. During this period, crystal formation begins to occur in the hot oil and we find that if the bulk of oil is kept at about 47° C., adequate seeding of the oil has occurred in about 6 hours. After seeding, the temperature of the oil is increased to 70°–75° C., over a period not exceeding 2 hours to melt any solids present other than the desired crystal seeds and is then immediately and carefully cooled. The rate of cooling during this and subsequent fractionations is very important and we find it necessary to use a period of not less than 5 hours to reduce the temperature of 28°–33° C. For example, a cooling rate of 5° C. per hour can be used, the cooling rate preferably being based on a heat transfer control, to reach a final temperature of 28°–32° C. in a period of 7–8 hours. In this way, it is possible to produce a first solid fraction which is separated, conveniently by filtration, decantation or centrifugation, a first liquid fraction. The separation is preferably carried out immediately the formation of the first solid fraction is complete and should be completed within 5 and preferably within 3 hours of the completion of formation of the first solid fraction.

This first solid fraction contains the high melting point triglycerides, normally the tri-saturated glycerides which are of no interest in the production of cocoa butter substitute and this fraction can be utilised for processing into other products. The first liquid fraction contains the desired di-saturated glycerides and this is subjected to a further fractionation step. This second fractionation step is carried out in a rather similar way to the first in that the first liquid fraction, is once again maintained at a temperature of 38°–48° C. for at least 4 hours, for example at 44° C. for 6 hours, during which period of time, small crystals begin to appear in the liquid phase. When this seeding of the first liquid fraction has occurred, the oil is heated to 60°–65° C., e.g. 63° C., over a period of 1.5–2 hours, e.g. 1.75 hours, to melt any solids present other than the desired crystal seeds and is once again immediately subjected to a carefully controlled cooling. In this second fractionation, the temperature of the oil is reduced from 60°–65° C. to 14°–17° C. over a period of not less than 10 hours and here, a typical cooling rate may be about 4°–5° C. per hour, based on a heat transfer control, so that a temperature of 15°–16° C. could be reached in a period of 11–13 hours. As a result of this controlled cooling, a second solid phase crystallizes out. This second solid phase, which is the desired mid-fraction, can be separated from the residual oil, by conventional methods, e.g. filtration, decantation or centrifugation, normally immediately formation of the mid-fraction is complete and, in any event, within 3 hours of completion of mid-fraction formation. It is important to control the temperature during the separation of the solid and liquid phases to within the final temperature range to which the oil is cooled after the second fractionation, that is to 14°–17° C.

By operating in this way, it is possible to recover a mid-fraction having an IV of 48–53 and melting point 32°–36° C. The residual second liquid phase will have an IV of 59–64, preferably 60–62 and a cloud point of 3°–7° C., preferably 3°–5° C.

The separated mid-fraction is found to consist predominately of 1,3-di-saturated and 1,2-di-unsaturated tri-glycerides. These two components comprise approximately 83% by weight of the total mid-fraction, the remainder being tri-saturated and tri-unsaturated glycerides, 1,2-di-saturated and 1,3-di-unsaturated glycerides.

This mid-fraction is one having a certain proportion of unsaturated residues containing more than one site of unsaturation. It is suitable for blending with cocoa butter but the incorporation of more than about 10% of this mid-fraction in cocoa butter adversely affects the Jenson cooling curve. If it is desirable, to extend cocoa butter to a greater extent without adversely affecting this cooling curve, we have found that it is possible to do this by subjecting the mid-fraction obtained by the fractionation method described above, to partial hydrogenation so as to remove, to a very large extent or substantially completely, unsaturated glycerides containing more than one site of unsaturation. This final hydrogenation step can be carried out in a manner known per se by catalytic hydrogenation, for example using a nickel containing or a platinum or palladium containing catalyst which may be supported or unsupported. Hydrogenation can be carried out at a relatively low temperature, e.g. not above 300° C. or at temperatures up to about 250° C. the progress of the hydrogenation being monitored both by the amount of hydrogen absorbed and by the IV of the triglyceride. We have found that the best results are obtained when linoleic acid content of the hydrogenated triglyceride is not more than 3% and preferably not more than 2% when measured by gas liquid chromatography by the method described in AOCS CE1-62 and the iodine value is reduced to 38–45.5 and preferably to 44–45.5.

As an alternative to the partial hydrogenation of the separated mid-fraction, we have found that by incorporating 0.01–1.5% by weight of an edible structural modifier into the mid-fraction, we can produce a product of superior physical and taste properties which can be used for blending with cocoa butter in an amount of up to 30% by weight or even more without adversely affecting the Jenson cooling curve.

The purpose of the selective hydrogenation in step 7A is to convert the polyunsaturated chains in the triglyceride into mono-unsaturated chains, but the use of catalytic hydrogenation to produce a cocoa butter substitute or extender is not always desirable from the health point of view and Government health agencies are beginning to legislate against the use of such hydrogenated products. In our alternative procedure of incorporating a modifier in the mid-fraction, the polyunsaturated chains remain in the final product whose iodine value is substantially identical to that of the untreated mid-fraction. However, two or three times the amount, or even more, of the modified mid-fraction compared to untreated mid-fraction can be introduced into cocoa butter before the adverse effect on the Jenson curve begins to become apparent. We find that when the modifier is incorporated in the mid-fraction, it undergoes a most surprising physical change in that, instead of being an ordinary liquid, it increases in plasticity and becomes dimensionally stable holding any shape and can be cast or moulded into bars or slabs which can then be transported as if it were a solid material. This effect is not particularly noticeable on laboratory scale, but occurs quite rapidly on pilot plant scale or above.

As a practical matter, we find it convenient to melt the mid-fraction to a temperature of about 65°–75° C., to stir in about 0.5–1% by weight of the modifier and then to allow the mass to cool slowly while agitation is maintained. For example, if the mid-fraction is heated to 70° C., the mixture including the modifier can be stirred for 15 minutes at 70° C. and then allowed to cool to 25°–30° C. over a period of at least 24 hours e.g. about 48 hours, the mixture being stirred preferably continuously during the cooling period. At the end of this period, the product can be cast or moulded and becomes dimensionally stable for prolonged storage periods.

The function of the modifier is uncertain at the moment, but it is believed that it provides a continuous phase enclosing small particles of the palm oil. Any of the edible, naturally occurring, semisynthetic or synthetic gums can be used as a modifier in accordance with this invention and legislation of many countries lists those gums permitted in foodstuffs. "Gum" in this Patent Specification means any material which can be dissolved or dispersed in water to give a viscous solution or dispersion. We find that a mixture of a guaranate and carraghenate gum, permitted in most countries, is quite suitable. Other vegetable gums, such as alginates, carob gum, gum arabic or gum tragacanth can also be used. These gums are normally available as dry pulverulant solids and can be blended in that form into the mid-fraction.

A particularly convenient way of carrying out the fractionation stages of the present invention involves the use of the fractionator and fractionation procedure described in Belgian Pat. No. 713,430. This fractionator is essentially a fractionating tank provided with inlet and outlet conduits, internal mechanical agitating means and baffles and an encircling heat exchange jacket. A heat exchange liquid is circulated through the heat exchange jacket so that the contents of the tank can be heated or cooled. Temperature sensing means are provided for both the contents of the tank and the contents of the heating jacket and signals from these two temperature sensing means are analysed and utilised in an automatic control system which can control the heat transferred from the oil to the heat exchange fluid. In this way, it is possible, during the cooling phase of the fractionation, to maintain a very carefully controlled delta T, the rate at which the contents of the fractionating vessel are cooled.

It is, of course, also possible to carry out the heating phases of the oil in the fractionating vessel, utilising a heat exchanger on the cooling circuit and then to cool the oil, at the controlled rate, to the desired temperature, by injecting a cold or chilled fluid into the same circuit under the control of the automatic system.

When the formation of a solid phase in the oil is completed, the solid and liquid phases are separated from one another, e.g. by filtration. We have found that it is advantageous to filter the material on a stainless steel filter of the type described in Belgian Specification No. 713330 which permits careful temperature control during the separation of the solid and liquid phases from one another.

The following Examples are given to illustrate the invention.

EXAMPLE 1

A phospholipid-free, neutralized, pre-bleached, Malaysian Palm oil was fractionated using a fractionator of the type described in Belgian Pat. No. 713430 and the solid stearine fraction separated from the liquid fraction on a Florentine filter of the type described in Belgian Pat. No. 713330.

18 Kilos of the palm oil was melted and placed inside the fractionator where it was maintained at 47° C. for 6 hours. After this period of time, the temperature of the oil was elevated to 72° C. over a period of 1.75 hrs.

The oil was then allowed to cool at a rate of 4° C./hr., the cooling rate being uniformly maintained until the oil temperature was 30° C. The mixture was then filtered on the Florentine filter to give a first stearine fraction of 19% yield. The composition and characteristics of this stearine fraction are shown in Table 1.

TABLE 1

| Combined Fatty Acids % wt. | |
|---|---|
| $C_{12}$ | .11 |
| $C_{14}$ | 1.06 |
| $C_{16}$ | 56.54 |

TABLE 1-continued

| Combined Fatty Acids % wt. | |
|---|---|
| $C_{18}$ | 4.6 |
| $C_{18}$ (mono-unsaturated) | 29.09 |
| $C_{18}$ (di-unsaturated) | 8.6 |
| Slip Point °C. | 52 |
| Iodine Value | 42.2 |

The liquid fraction from the first fractionater was maintained in the fractionater at 47° C. for 3.5 hrs., and then elevated in temperature to 65° C., whereupon the oil was cooled at a rate of 2½° C./hr., the cooling rate being uniformly maintained until an oil temperature of 15° C. was reached. At this temperature crystallisation in the vitreous phase occurs. By this we mean that a crystalline layer forms suddenly around existing crystals suspended in the liquid phase so that the character of the oil changes from one being predominantly liquid in which crystals are suspended to one being predominantly solid but still having a liquid phase but now totally enclosed inside the solid stearine mass.

It is however possible to separate the liquid phase from the solid stearine phase obtained under these conditions of vitreous phase crystallisation using the Florentine filter and carrying out the filtration at 14°-17° C. The desired stearine or mid-fraction recovered gave a 36.5% yield.

The resulting mid-fraction was then subjected to partial hydrogenation in an autoclave at a temperature of 180° C. using a 10 psi pressure of hydrogen. A nickel containing catalyst (Unichema PS) was used in a proportion of 2 lb/ton equivalent. The hydrogenation was carried out for 15 minutes until the iodine value was reduced from 52.5 to 46.1. The composition and characteristics of the mid-fraction before and after hydrogenation are given in Table 2.

TABLE 2

| Combined Fatty Acids % wt. | Mid-fraction Stearine | Hydrogenated Mid-fraction stearine |
|---|---|---|
| $C_{12}$ | .12 | trace |
| $C_{14}$ | .79 | .81 |
| $C_{16}$ | 43.8 | 41.2 |
| $C_{18}$ | 3.6 | 4.7 |
| $C_{18}$-mono-unsaturated | 42.1 | 51.8 |
| $C_{18}$-di-unsaturated | 9.59 | 1.49 |
| Slip Point | 32° C. | 37.2° C. |
| Iodine Value | 52.5 | 46.1 |
| Cooling Curve °C.* | | |
| Max. | | 25.5 |
| Min. | | 20.1 |
| Rise | | 5.4 |
| Time (mins.) | | 80 |

*Jenson Cooling Curve method as described by B. W. Manifie in "Chocolate, Cocoa and Confectionery Science and Technology" based on 30% addition of the hydrogenated mid-fraction stearine to cocoa butter.

The liquid fraction from the vitreous phase crystallisation was recovered in a yield of 44.5%. Its composition and characteristics are shown in Table 3:

TABLE 3

| Fatty Acids % wt. | |
|---|---|
| $C_{12}$ | .13 |
| $C_{14}$ | 1.28 |
| $C_{16}$ | 36.9 |
| $C_{18}$ | 3.42 |
| $C_{18}$ (mono-unsaturated) | 43.6 |

TABLE 3-continued

| Fatty Acids % wt. | |
| --- | --- |
| $C_{18}$ (di-unsaturated) | 14.67 |
| Cloud Point °C. | 4 |
| Iodine Value | 61.2 |

EXAMPLE 2

A phospholipid-free neutralised pre-earth bleached Malaysian palm oil was fractionated by the procedure similar to that described in Example 1 to give two 200 Kg samples of mid-fraction recovered in a 20% yield.

In the first stage of the fractionation, temperature control was identical to that in the first stage of fractionation in Example 1. The temperature of the liquid fraction from the first fractionater was then adjusted to 16° C. over a period of 12 hours, held at 16° C. for a further 2½ hours, cooled rapidly to 15° C. and then rapidly filtered at 15° C. so that a solid mid-fraction was recovered in 20% yield. The composition and characteristics of this mid-fraction was as follows:

| Combined fatty acids | weight % |
| --- | --- |
| $C_{12}$ | trace |
| $C_{14}$ | 1.3 |
| $C_{16}$ | 47.27 |
| $C_{18}$ | 3.65 |
| $C_{18}$ mono-unsaturated | 40.67 |
| $C_{18}$ di-unsaturated | 7.29 |
| Slip point | 33.5° C. |
| IV | 48.17 |

These fractions were then heat bleached and deodorized. The deodorized mid-fraction was then heated to a temperature of 70° C. and homogenised and 0.12% w/w of gums added. The gum used was a mixture of 0.04% carraghenate of 40 micron particle size, 0.04% of carraghenate of ungraded particle size and 0.04 guaranate of 40 micron particle size.

This mixture was then slowly cooled to between 25°-30° C. over a period of 2.5 hours. The product was then cast into 20 kilo blocks and allowed to cool naturally to room temperature. The product so formed was the vitreous phase and at a temperature of 18° C. had physical properties similar to cocoa butter.

The addition of the gum did not alter the melting point or crystallization temperature but increased homogenity and plasticity. The untreated mid-fraction and gum-treated mid-fraction were blended into chocolate, of the following composition:
Chocolate liquor: 45 g
Untreated or gum-treated mid-fraction: 5 g
Sugar: 49.05 g
Lecithin: 0.05 g The chocolate so prepared was compared against a similar chocolate containing total cocoa products, i.e. 50 g chocolate liquor and no mid-fraction, for its 'snap' characteristics. Taking the total cocoa product as the ideal 100% snap at the temperature of test of 18° C. the following were recorded:

| SNAP AT | UNTREATED MID-FRACTION | GUM-TREATED MID-FRACTION |
| --- | --- | --- |
| 24 Hr. | 80.5% | 94.4% |
| 48 Hr. | 77.7% | 88.9% |
| 6 days | 77.7% | 94.4% |

We claim:
1. A method for producing a cocoa butter substitute or extender comprising the steps of:
   1. maintaining a phospholipid-free neutralized pre-bleached palm oil having an IV of 50-55 at a temperature of 42°-52° C. for a period of at least 6 hours to initiate crystal formation.
   2. increasing the temperature of the palm oil to 70°-75° C. over a period not exceeding 2 hours to melt all the solids except seed crystals and then immediately subjecting to cooling the palm oil to a temperature of 28°-33° C. over a period of not less than 5 hours to produce a first liquid fraction of IV 55-60 and a first solid fraction of IV 38-44 and melting point 50°-55° C.
   3. separating the first liquid fraction from the first solid fraction within 5 hours of completion of formation of the first solid fraction.
   4. maintaining the first liquid fraction at a temperature of at least 65° C. for a period of time sufficient to form a fluid homogeneous crystal free oil and then subjecting the first liquid fraction to a temperature of 38°-48° C. for a period of at least 4 hours to initiate crystal formation.
   5. increasing the temperature of the first liquid fraction to 60°-65° C. over a period of 1.5-2 hours to melt all the solids except seed crystals and then immediately subjecting to cooling the first liquid fraction to a temperature of 14°-17° C. over a period of not less than 10 hours to form a second liquid fraction of IV 59-64 and a cloud point of 3°-7° C. and a palm oil mid-fraction of IV 48-53 and a slip melting point of 32°-36° C.
   6. separating the second liquid fraction from the mid-fraction at a temperature of 14°-17° C. within 3 hours of completition of formation of the mid-fraction, to give a separated mid-fraction for use as said cocoa butter substitute or extender.

2. A method according to claim 1 wherein, in step 2 the oil is cooled at the rate of about 5° C. per hour so that a temperature of 28°-32° C. is reached in 7-8 hours.

3. A method according to claim 1 wherein, in step 3, the first solid fraction and first liquid fraction are separated within 3 hours of completion of formation of the first solid fraction.

4. A method according to claim 1 wherein, in step 4, the first liquid fraction is held at about 44° C. until crystal seeds begin to appear.

5. A method according to claim 1 wherein, in step 5, the first liquid fraction is cooled at the rate of 4°-5° C. per hour so that a temperature of 15°-16° C. is reached in 11-13 hours.

6. A method according to claim 1 wherein the cooling rate in step 5 and the final temperature at the end of cooling in step 5 is such that the palm oil mid-fraction has an iodine value of 52-53 and a slip point of 32° C. and the second liquid fraction has an iodine value of 60-62 and a cloud point of 3°-5° C.

7. A process according to claim 1 wherein, after Step 6 there is incorporated into the separated mid-fraction 0.01 to 1.5% by weight of at least one edible naturally occurring or synthetic gum or mixture thereof, based on the weight of mid-fraction.

8. A method according to claim 7 wherein 0.01–1.5% by weight of a dry edible gum which is a mixture of quaranate and carraghenate is incorporated into the separated mid-fraction as the modifier.

9. A method according to claim 8 wherein the separated mid-fraction is heated to above its melting point, 0.5–1% by weight of the gum blended into the molten mid-fraction and the molten mid-fraction then cooled to 25°–30° C. over a period of at least 24 hours while the mixture is agitated.

10. A method according to claim 7 wherein, the gum is at least one of guaranate or carraghenate gum.

11. A method according to claim 7 wherein, after incorporation of the gum, the cooled mid-fraction is cast or moulded.

12. A method of extending cocoa butter which comprises incorporating in the cocoa butter a substitute or extender obtained by a process according to claim 1 or 7.

13. A chocolate product containing a cocoa butter substitute or extender obtained by a process according to claim 1 or 7.

* * * * *